US005820152A

United States Patent [19]

Warren-Pfaeffle et al.

[11] Patent Number: 5,820,152

[45] Date of Patent: Oct. 13, 1998

[54] WHEELCHAIR AND WATER CLOSET CHAIR WITH REMOTE CONTROL EXTENDING ARMS CLOSING A CAP

[76] Inventors: Patricia E. Warren-Pfaeffle, 72 S, Charles St., Hopelawn, N.J. 08861; Thomas Peter Pfaeffle, 2081 Whitman Way, Apt. 121, San Bruno, Calif. 94066

[21] Appl. No.: 565,691

[22] Filed: Dec. 1, 1995

[51] Int. Cl.[6] ................................ B62M 1/14; A47C 7/54

[52] U.S. Cl. .................................... 280/250.1; 280/304.1; 280/657; 4/254; 297/411.36

[58] Field of Search .............................. 280/250.1, 304.1, 280/638, 657; 180/907; 4/254; 297/411.36, DIG. 10

[56] References Cited

U.S. PATENT DOCUMENTS

| | | | |
|---|---|---|---|
| 1,353,749 | 9/1920 | Hegarty . | |
| 2,773,542 | 12/1956 | Chasin . | |
| 3,011,179 | 11/1961 | Hussey . | |
| 3,584,890 | 6/1971 | Presty | 280/304.1 X |
| 3,619,820 | 11/1971 | Cain et al. . | |
| 3,835,857 | 9/1974 | Rogers, III et al. . | |
| 3,894,303 | 7/1975 | Angel | 297/DIG. 10 X |
| 3,927,426 | 12/1975 | Geddes . | |
| 4,023,216 | 5/1977 | Li . | |
| 4,031,576 | 6/1977 | Epstein . | |
| 4,144,597 | 3/1979 | Guenther et al. . | |
| 4,270,231 | 6/1981 | Zint . | |
| 4,309,779 | 1/1982 | Knight . | |
| 4,489,981 | 12/1984 | Goleski | 297/411.36 |
| 4,531,245 | 7/1985 | Lowd et al. . | |
| 4,587,678 | 5/1986 | Love et al. . | |
| 4,769,858 | 9/1988 | Gamm et al. . | |
| 4,884,841 | 12/1989 | Holley . | |
| 4,968,094 | 11/1990 | Froyland et al. | 97/411.36 |
| 5,010,599 | 4/1991 | Nilsson . | |
| 5,027,446 | 7/1991 | Robertson | 4/254 |
| 5,226,439 | 7/1993 | O'Keeffe et al. . | |
| 5,242,138 | 9/1993 | Kornberg | 297/411.36 X |
| 5,285,532 | 2/1994 | Sealy . | |
| 5,480,173 | 1/1996 | Koniecko | 280/250.1 |
| 5,561,872 | 10/1996 | Phillips | 4/254 X |

*Primary Examiner*—Victor E. Johnson

*Attorney, Agent, or Firm*—Cobrin Gittes & Samuel

[57] ABSTRACT

A wheelchair or water closet chair that has arms that may be selectively raised and lowered and a water closet chair that has handgrips that may be selectively raised and lowered. The arms and handgrips have extensions movable towards each other to effect engagement with each other. In addition, each has sensors that sense when the extensions of each are in alignment with each other.

16 Claims, 3 Drawing Sheets

WHEELCHAIR AND WATER CLOSET CHAIR WITH REMOTE CONTROL EXTENDING ARMS CLOSING A CAP

BACKGROUND OF THE INVENTION

The present invention relates to aids for persons using wheelchairs including a stable support connection that extends across a gap between aids. Such a connection secures together handgrips of an aid, such as a water closet chair, with arms of another aid, such as a wheelchair. It assists such disabled or partially disabled persons in transferring themselves from one aid to another in that the gap between such aids is traversed by the stable connection, which may be grasped while pulling one's body across the gap between the aids.

Persons who use wheelchairs may have difficulty transferring themselves between various aids or devices, such as a wheelchair, and a water chair. Often, there is a gap between the aid or device which the person is going to and the aid or device that the person is leaving. As a result, the person must reach across this gap to grasp the aid or device at the other side, thereby adversely affecting the leverage that the person has to pull or carry his/her weight across the gap.

SUMMARY OF THE INVENTION

The present invention is directed to aids for disabled or partially disabled persons.

One aspect of the invention resides in an aid having cooperating elements that engage each other to form a sturdy, stable connection across a gap between spaced apart aids. The cooperating elements are part of handgrips of a water closet and arms of a wheelchair or water closet chair. Sensors are provided to sense alignment for effecting the engagement of the cooperating elements and an indicator makes an indication accordingly when the sensors are in alignment between different ones of the aids or devices.

Another aspect resides in an aid in the form of a wheelchair or water closet chair, each having arms or handgrips movable relative to their frames and having sensors that sense alignment of the sensors with others that are external to the frame, such as those on another aid. The alignment triggers an indications that the arms or handgrips may be moved into engagement with those of another.

BRIEF DESCRIPTION OF THE DRAWINGS

For a better understanding of the present invention, reference is made to the following description and accompanying drawings, while the scope of the invention is set forth in the appended claims.

DESCRIPTION OF THE PREFERRED EMBODIMENT

Figure 1:
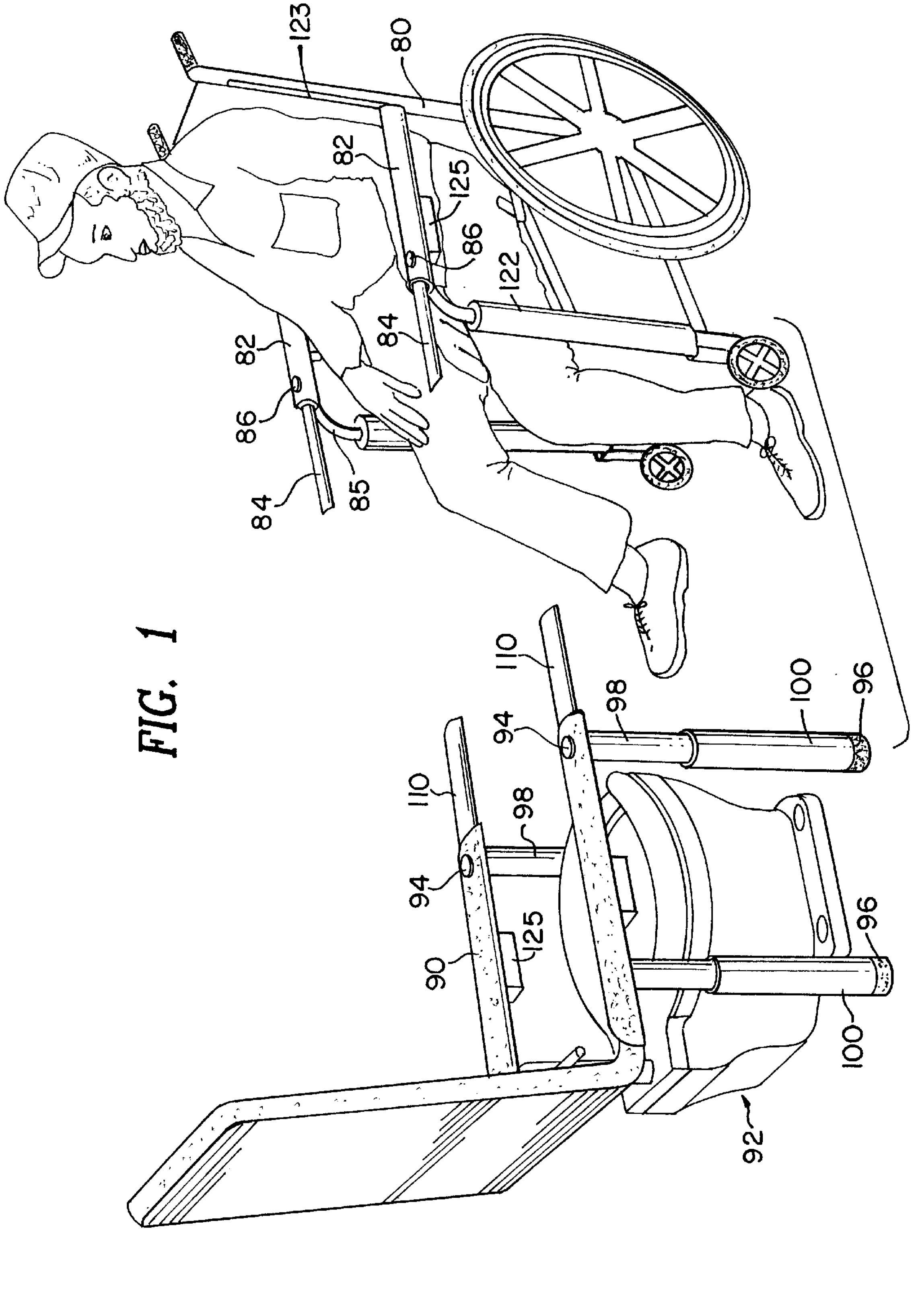
FIG. 1 is a perspective view of a person in a wheel chair approaching a water closet chair that has two hand grips.

The preferred embodiment is depicted in FIGS. 1–5. FIG. 1 shows the wheelchair 80 in a separated position relative to the water closet chair 92. Each has cooperating elements that provide for a stable connection therebetween in the manner shown in FIG. 2. The cooperating elements include the pair of arms of the wheelchair and the pair of handgrips of the water; at least one pair of the arms and handgrips are movable relative to the other to span a two to three foot distance. Although a man is shown in the wheelchair in preparation for using the invention to transfer to the water closet chair, the invention also may be used by females in the same manner.

The frame of the wheelchair 80 may include an arm housing 82, a movable arm extension 84 that is movable relative to the arm housing 82, an arm rod 85 that is movable relative to a vertically extending sleeve 122, two buttons 86 to actuate a respective motorized driver 125 on the underside of an associated one of the arm housings 82 and a motorized driver (not shown) for moving the arm rod 85 relative to the sleeve 122. An end of each of the arm housings 82 fit within a respective groove 123 (FIG. 1) at the backrest support rods of the chair to guide the arm housings during raising and lowering caused by the arm rod 85 being driven by the drive mechanism.

Figure 2:
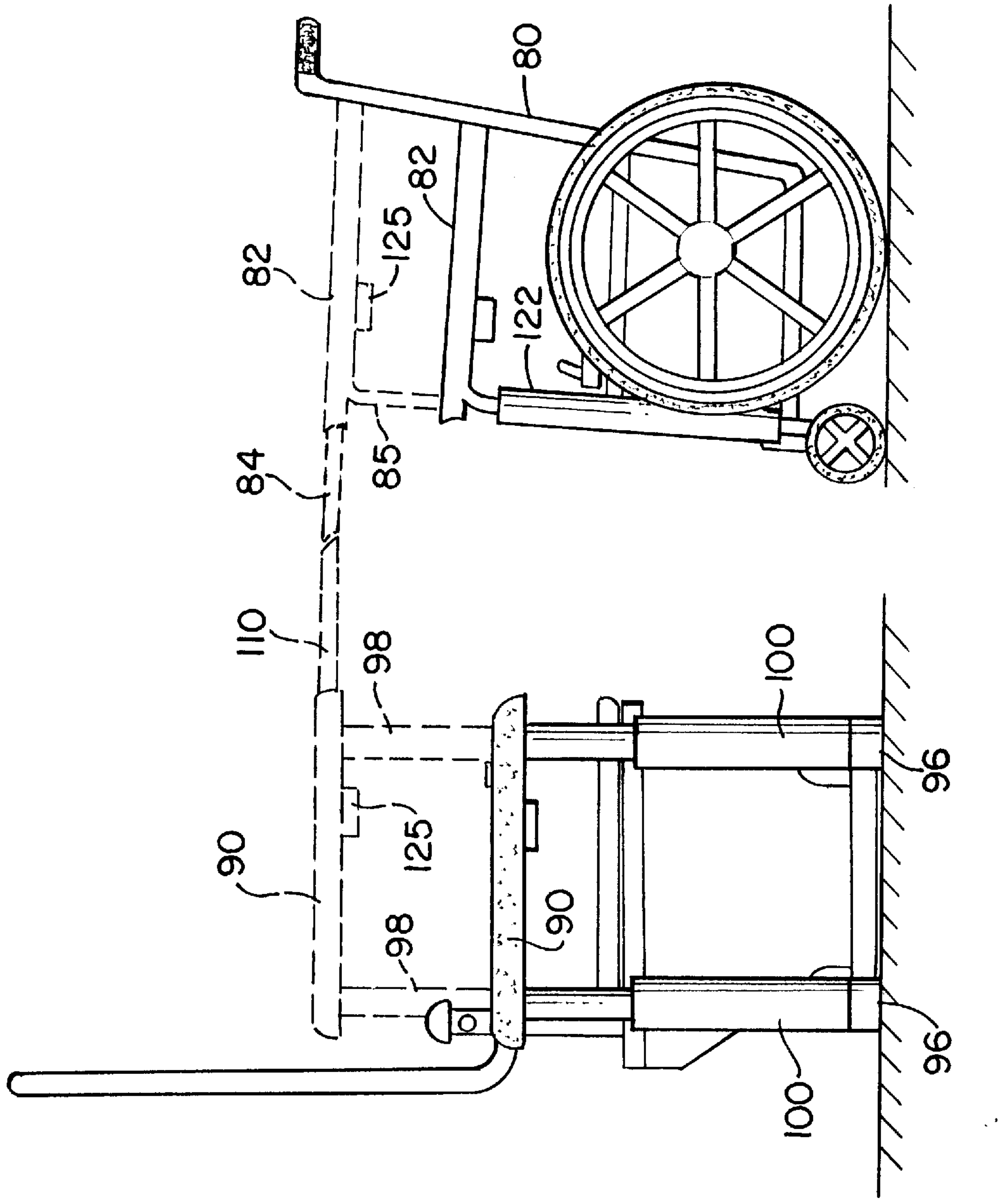
FIG. 2 is an elevational side view of the hand grips and wheelchair arms, with their raised position shown in phantom.

These movements of the wheelchair arm rods 85 and the sliding members 110 are represented by phantom lines in FIG. 2. In the fully retracted position of the arm rod 85, the movable arm extension 84 is shown in its fully retracted position as well. In the fully extended position of the arm rod 85, the movable arm extension 84 is shown in its fully extended position.

The water closet chair 92 may include a handgrip 90, a sliding member 110 that is slidingly movable relative to the handgrip 90, and a vertical extension 98 that is movable relative to a vertical housing 100 by actuation of a motorized driver 96. The sliding member 110 moves in response to actuation of a motorized driver 125 on the underside of the handgrip 90 and may be identical to that on the underside of the wheelchair arm housing 82.

The movements of the handgrips and the sliding members is represented by phantom lines in FIG. 2. In the fully retracted position of the vertical extension 98, the sliding members 110 are shown in a fully retracted position as well, but in the fully extended position of the vertical extension 98, the sliding members 110 are shown in a fully extended position as well.

Figure 5:
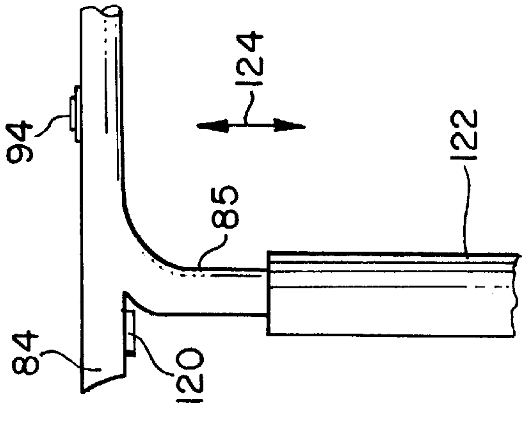
FIG. 5 is a partial elevational view of the wheelchair arms of FIG. 2 in a raised position and aligned with the hand grip support.
Figure 3:
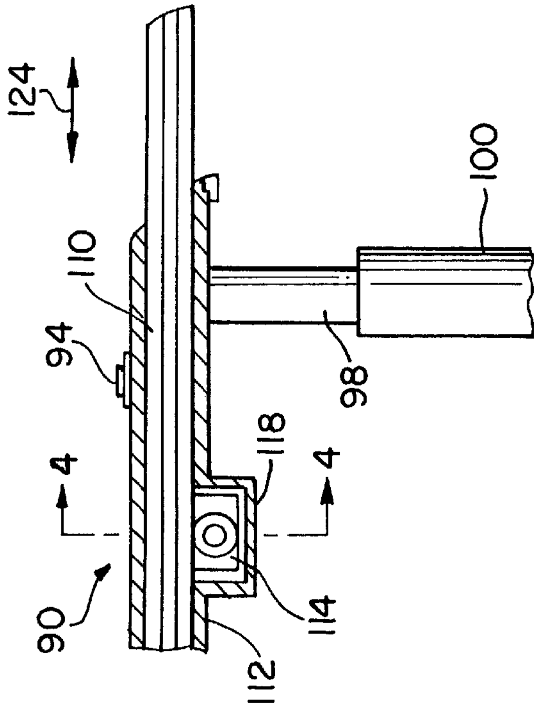
FIG. 3 is a partially broken elevational side view of a portion of the hand grip support of FIG. 2 with the hand grip support in a raised position and aligned with the wheelchair arms.
Figure 4:
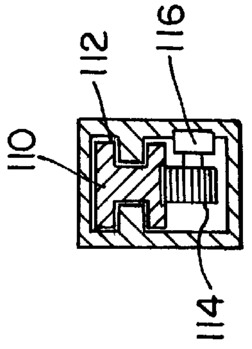
FIG. 4 is a cross-section across 15—15 of FIG. 3.

FIGS. 3, 4, and 5 show the sliding member 110 to be I-shaped within a handgrip housing 112 and driveable by a wheel 114 that is rotatably driven by a motorized driver 116. The motorized driver and wheel may be enclosed within a compartment 118. Light sensors 120 on the handgrip and the wheelchair movable arm extension 84 face each other and transmit signals in a conventional manner to an indicator (no shown) when they become aligned for engagement. The wheelchair arm 82 may be raised or lowered with respect to its sleeve 122 (see FIGS. 2 and 5). Appropriate actuation buttons 94 (see FIGS. 3 and 5) are provided to align the light sensors 120 and engage the wheelchair movable arm extension 84 and sliding member 110. Movements are indicated by direction arrows 124.

The light sensors 120 may be arranged either on the extension 84 and sliding member 110 or on the arm rod 85 and vertical extension 98 so as to sense when the sensors 120 are aligned and thereby that the extension 84 and sliding member 110 are in position for engaging each other. The sensors 120 may be equipped with an indicator (not shown) that makes an indication when the sensors are aligned. For example, the indication may be audible, visual or vibratory. The indicator may be part of the sensor itself.

The actuation buttons 86, 94 are exemplary and may be four-way switches operable in that depressing the buttons may result in lowering, pulling the buttons upwardly may result in raising, sliding/pressing the buttons forwardly may result in outward movement of the sliding/pressing member 110 or movable arm extensions 84 as applicable, and sliding the buttons rearwardly may result in inward movement of the sliding member 110 into a handgrip 90 or arm extension 84 into a wheelchair arm 82 as applicable. Instead of a single button responsible for actuating movements in all directions, multiple buttons may be provided with each responsible for a single direction of movement or for opposite direction of movements.

In addition to the possibility of the wheel chair movable arm extensions 84 engaging the water closet chair sliding member 110, they may be configured to engage instead the water closet chair handgrips directly. The result of the engagement is a stable connection for supporting the weight of the disabled or partially disable person as he/she transfers himself/herself between the wheelchair and water closet chair. Sensors 120 should be used to indicate alignment for positioning purposes.

While the foregoing description and drawings represent the preferred embodiments of the present invention, it will be understood that various changes and modifications may be made without departing from the spirit and scope of the present invention.

What is claimed is:

1. An apparatus to aid persons who use a wheelchair, comprising:

a wheelchair frame having a pair of wheelchair arms each with an end and a pair of backrest support rods each with a groove, the ends of the arms each being engaged with a respective one of the grooves; and an arm driver that drives the arms between starting and elevated positions such that the ends of the arms move within the engaged ones of the grooves.

2. An apparatus as in claim 1, further comprising:

a pair of handgrips of a water closet chair and movable towards the pair of arms of the wheelchair into an engaging position to provide stable support and movable in a direction away from the arms into a separated position; and handgrip drivers that move said pair of handgrips between the engaging and separated positions.

3. An apparatus as in claim 2, wherein the handgrip drivers selectively raise and lower the handgrips of said water closet chair in cooperation with the raising and lowering of the wheelchair arms and thereby cooperating with a pair of wheelchair extensions, one wheelchair extension projecting from each of the wheelchair arms in a direction of elongation of the wheelchair arms, so that said wheelchair extensions engage said handgrips in an overlapping manner.

4. An apparatus as in claim 3, further comprising a sensor on the handgrips and a sensor on the wheelchair arms, said sensors being operative to sense alignment of said sensors with each other, and an indicator responsive to the sensors sensing the alignment to make an indication.

5. An apparatus as in claim 2, further comprising sensors that sense alignment between the handgrips and the wheelchair arms.

6. An apparatus as in claim 5, wherein the sensors are light sensors, at least one of the sensors being in connection with an indicator that indicates alignment between the sensors.

7. An apparatus as in claim 1, further including a pair wheelchair extensions movable relative to the arms in opposite directions between retracted and fully extended positions, the extensions being configured for engagement with handgrip extensions of a water closet chair.

8. An apparatus as in claim 1, further comprising a sensor attached to the wheelchair frame so as to move in unison with the movement of at least one of the arms to sense alignment with a further sensor spaced from the wheelchair frame.

9. An apparatus as in claim 8, further comprising a water closet with handgrips, at least one of the handgrips including the another sensor in the alignment.

10. An apparatus to aid persons who use a wheelchair, comprising:

a pair of wheelchair arms;

drivers that raise and lower the arms between different elevations relative to a frame of the wheelchair; and a pair of wheelchair arm extensions attached to said arms so as to be movable between a retracted position and a fully extended position relative to said wheelchair arms and being movable in unison with said wheelchair arms as said wheelchair arms are raised and lowered between said different elevations.

11. An apparatus as in claim 10, further comprising further drivers that drive the wheelchair arm extensions in opposite directions between the retracted and fully extended positions.

12. An apparatus as in claim 10, wherein said wheelchair frame includes backrest support rods each having a groove, said arms each having a free end movable within a respective one of said grooves.

13. An apparatus as in claim 10, wherein said extensions are configured to engage with handgrip extensions of a water closet chair.

14. An apparatus as in claim 13, further comprising sensors operative to sense a relative position in which said handgrips and said extensions are in alignment with each other; and an indicator responsive to sensing of the alignment to make an indication.

15. An apparatus as in claim 13, wherein said sensors are attached to said extensions.

16. An apparatus as in claim 10, wherein said wheelchair frame includes backrest support rods each having a groove, said arms each having a free end engaged within a respective one of said grooves.

* * * * *

UNITED STATES PATENT AND TRADEMARK OFFICE

CERTIFICATE OF CORRECTION

PATENT NO. : 5,820,152

DATED : October 13, 1998

INVENTOR(S) : Patricia E. Warren-Pfaeffle, Thomas Peter Pfaeffle

It is certified that error appears in the above-identified patent and that said Letters Patent is hereby corrected as shown below:

COVER PAGE IN THE TITLE AT [54]:and Column 1, line 3,

CHANGE "CAP" TO --GAP--.

Signed and Sealed this

Twenty-second Day of June, 1999

*Attest:*

Q. TODD DICKINSON

*Attesting Officer*

*Acting Commissioner of Patents and Trademarks*